United States Patent
Bender et al.

(10) Patent No.: US 10,536,460 B2
(45) Date of Patent: Jan. 14, 2020

(54) SHARING OF ANONYMOUS DATA BETWEEN CONNECTED DEVICES OVER THE INTERNET

(71) Applicant: International Business Machines Corporation, Armonk, NY (US)

(72) Inventors: Michael Bender, Rye Brook, NY (US); Rhonda L. Childress, Austin, TX (US); Rahul Gupta, Austin, TX (US); Timothy J. Hahn, Cary, NC (US); David B. Kumhyr, Austin, TX (US); Joanna W. Ng, Unionville (CA)

(73) Assignee: International Business Machines Corporation, Armonk, NY (US)

( * ) Notice: Subject to any disclaimer, the term of this patent is extended or adjusted under 35 U.S.C. 154(b) by 192 days.

(21) Appl. No.: 15/411,166

(22) Filed: Jan. 20, 2017

(65) Prior Publication Data
US 2018/0212964 A1   Jul. 26, 2018

(51) Int. Cl.
*H04L 29/06*   (2006.01)

(52) U.S. Cl.
CPC .......... *H04L 63/10* (2013.01); *H04L 63/0421* (2013.01); *H04L 63/065* (2013.01); *H04L 63/067* (2013.01); *H04L 63/126* (2013.01); *H04L 63/061* (2013.01)

(58) Field of Classification Search
CPC ....... G06F 21/31; H04W 12/06; H04W 12/08; H04W 4/60; H04W 12/02; H04L 63/10
See application file for complete search history.

(56) References Cited

U.S. PATENT DOCUMENTS

| | | | |
|---|---|---|---|
| 6,615,199 B1 * | 9/2003 | Bowman-Amuah | G06F 9/449 706/50 |
| 7,877,790 B2 * | 1/2011 | Vishik | G06K 9/00885 713/183 |
| 8,582,572 B2 * | 11/2013 | Fernandez Gutierrez | H04L 12/185 370/390 |
| 8,898,746 B2 * | 11/2014 | Gregg | H04L 63/10 726/29 |
| 9,202,074 B1 * | 12/2015 | Bennett | G06F 21/602 |
| 9,507,786 B2 * | 11/2016 | Dhuse | G06F 17/30106 |

(Continued)

FOREIGN PATENT DOCUMENTS

WO   2015052480 A1   4/2015

*Primary Examiner* — Theodore C Parsons
*Assistant Examiner* — Howard H. Louie
(74) *Attorney, Agent, or Firm* — North Shore Patents, P.C.; Michele Liu Baillie

(57) ABSTRACT

In the sharing of data between connected devices over a network, a network device broadcasts an availability of a set of data collected by a data producing device coupled to the network. The network device receives a request to access the set of data from a data consuming device coupled to the network, and a cognitive computing module of the network device determines a set of terms between the data producing and the data consuming devices for access to the set of data. In response, the network device obtains the set of data and a first key from the data producing device. Upon receiving a second key from the data consuming device, the network device determines that the second key is associated with the first key. In response, the network device provides access to the set of data to the data consuming device according to the set of terms.

9 Claims, 4 Drawing Sheets

(56) References Cited

U.S. PATENT DOCUMENTS

| | | | | |
|---|---|---|---|---|
| 9,529,996 | B2* | 12/2016 | Qureshi | G06F 21/10 |
| 9,582,482 | B1* | 2/2017 | Sharifi | G06F 17/241 |
| 9,781,602 | B1* | 10/2017 | Girdhar | H04W 4/70 |
| 2004/0093323 | A1* | 5/2004 | Bluhm | G06F 17/30011 |
| 2005/0131994 | A1* | 6/2005 | Chang | G06F 21/6209 |
| | | | | 709/203 |
| 2009/0259684 | A1* | 10/2009 | Knight | G06F 21/10 |
| 2012/0246337 | A1* | 9/2012 | Ross | H04L 45/308 |
| | | | | 709/238 |
| 2014/0200863 | A1* | 7/2014 | Kamat | G01C 15/00 |
| | | | | 703/1 |
| 2015/0009233 | A1* | 1/2015 | Phillips | G06T 19/006 |
| | | | | 345/633 |
| 2015/0103651 | A1* | 4/2015 | Kekki | H04W 28/0289 |
| | | | | 370/230 |
| 2015/0181415 | A1* | 6/2015 | Raleigh | H04W 8/22 |
| | | | | 455/418 |
| 2016/0203042 | A1* | 7/2016 | Gilreath | H04L 1/0045 |
| | | | | 714/807 |
| 2016/0203234 | A1 | 7/2016 | Piccand et al. | |
| 2016/0205106 | A1 | 7/2016 | Yacoub et al. | |
| 2016/0217519 | A1* | 7/2016 | Kozat | G06Q 30/0623 |
| 2016/0255081 | A1* | 9/2016 | Liu | H04L 63/0876 |
| | | | | 726/4 |
| 2016/0337354 | A1* | 11/2016 | Smadja | H04W 4/70 |
| 2016/0337377 | A1* | 11/2016 | Grube | G06F 17/30194 |
| 2016/0381405 | A1* | 12/2016 | Smith | H04N 21/2541 |
| | | | | 725/28 |
| 2017/0105171 | A1* | 4/2017 | Srivastava | H04L 67/327 |

\* cited by examiner

SHARING OF ANONYMOUS DATA BETWEEN CONNECTED DEVICES OVER THE INTERNET

BACKGROUND

Internet of Things (IoT) systems is the internetworking of physical devices that enable devices, embedded with a combination of software and hardware, to collect and exchange data over the Internet. IoT devices can include mobile phones, sports wearables, home heating and air conditioning systems, and more. In an industrial setting, these devices and sensors can be found in manufacturing equipment, the supply chain, and in-vehicle components. IoT devices can collect a large amount of data, which creates opportunities for analysis. This data may be of interest to other parties within the IoT system.

SUMMARY

Disclosed herein is a method for sharing data between connected devices over a network, and a computer program product and system as specified in the independent claims. Embodiments of the present invention are given in the dependent claims. Embodiments of the present invention can be freely combined with each other if they are not mutually exclusive.

According to an embodiment of the present invention, a network device broadcasts an availability of a set of data collected by a data producing device coupled to the network. The network device receives a request to access the set of data from a data consuming device coupled to the network. A cognitive computing module of the network device determines a set of terms between the data producing device and the data consuming device for access to the set of data. In response to determination of the set of terms, the network device obtains the set of data and a first key from the data producing device. The data producing, device sends a second key associated with the first key to the data consuming device. Upon receiving the second key from the data consuming device, the network device determines that the second, key is associated with the first key, and in response, provides access to the set of data to the data consuming device according to the set of terms.

DETAILED DESCRIPTION

Figure 1:
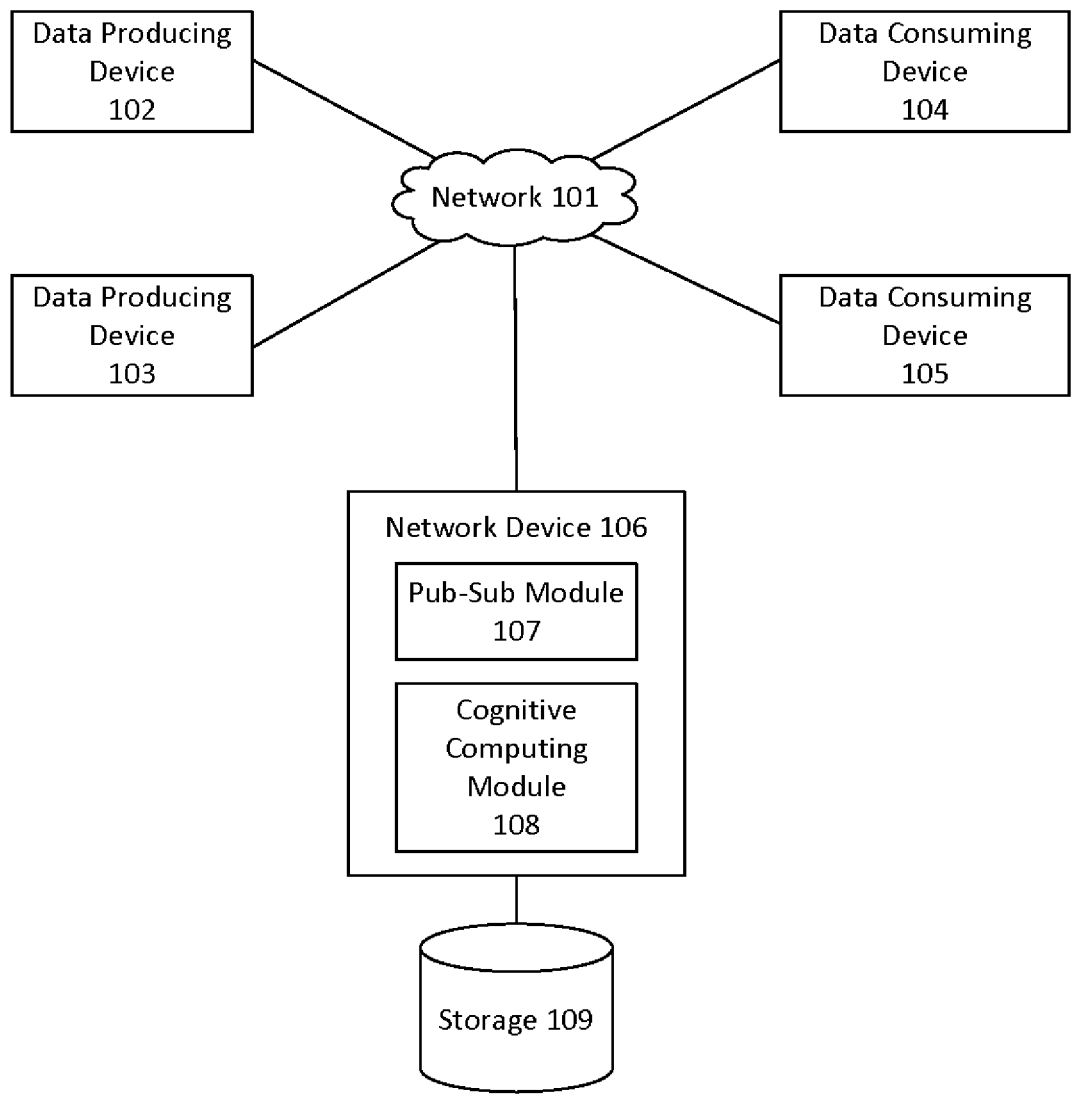
FIG. 1 illustrates an exemplary embodiment of a system for sharing data between connected devices over a network according to the present invention.

FIG. 1 illustrates an exemplary embodiment of a system for sharing data between connected devices over a network according to the present invention. The system includes one or more data producing devices 102-103 connected to one or more data consuming devices 104-105 over a network 101. In this exemplary embodiment, the network 101 is the Internet, and the device 102-105 are connected via an Internet of things (IoT) system. Each device 102-105 is uniquely identifiable in the network 101 and is able to interoperate within the Internet infrastructure. The data producing devices 102-103 may be augmented with sensors, actuators, and other components that collect data about a user of the device, usage activities, device location or environment, etc. The data consuming devices 104-105 may be augmented with components that may use the data collected by the data producing device 102-103 to perform some type of useful work. The devices 102-105 connected to a network device 106 over the network 101, such as a server providing a data market service, where the network device 106 includes a publish-subscribe (pub-sub) module 107, a cognitive computing module 108, and a storage 109. The pub-sub module 107 manages the sending of messages from publishers, e.g., the data producing devices 102-103, to subscribers, e.g., the data consuming devices 104-105. In this exemplary embodiment, the cognitive computing module 108 determines terms upon which the data producing devices 102-103 may provide data access to the data consuming devices 104-105 using a computerized cognitive model. The cognitive computing module 108 comprises a self-learning system that uses data mining, pattern recognition, and natural language processing to simulate human thought processes. The cognitive computing module 108 determines the terms without requiring human assistance or intervention. The cognitive computing module 108 further comprise a machine learning module (not shown) to continually process data input by the devices 102-105 and identify patterns in order to anticipate new problems and model possible solutions. The devices 102-106 of the system implement the sharing of data over the network 101 as described further below.

Figure 2:
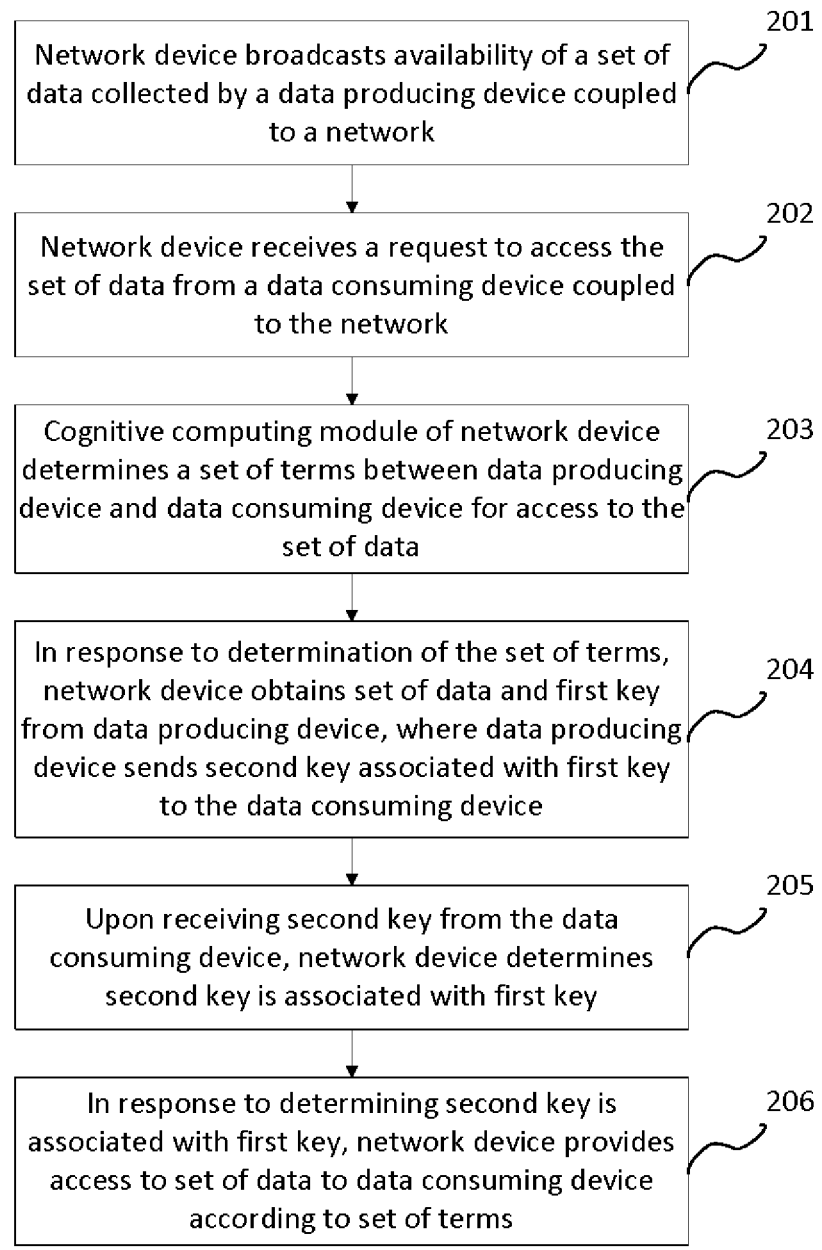
FIG. 2 illustrates an exemplary embodiment of a method for sharing data between connected devices over a network according to the present invention.

FIG. 2 illustrates an exemplary embodiment of a method for sharing data between connected devices over a network according to the present invention. In the method, the network devices 106 broadcasts the availability of a set of data collected by a data producing device 102 (or 103) coupled to the network 101 (201). The network device 106 receives a request to access the set of data from a data consuming device 104 (or 105) coupled to the network 101 (202). The cognitive computing module 108 of the network device 106 determines a set of terms between the data producing device 102 and the data consuming device 104 for access to the set of data (203). In response to the determination of the set of terms, the network device 106 obtains the set of data and a first key from the data producing device 102 (204), which the network device 106 may store in the storage 109. The data producing device 102 also sends a second key associated with the first key to the data consuming device 104. Upon receiving the second key from the data consuming device 104, the network device 106 determines that the second key is associated with the first key (205). In response to determining that the second key is associated with the first key, the network device 106 provides access to the set of data to the data consuming device 104 according to the set of terms (206).

Figure 3:
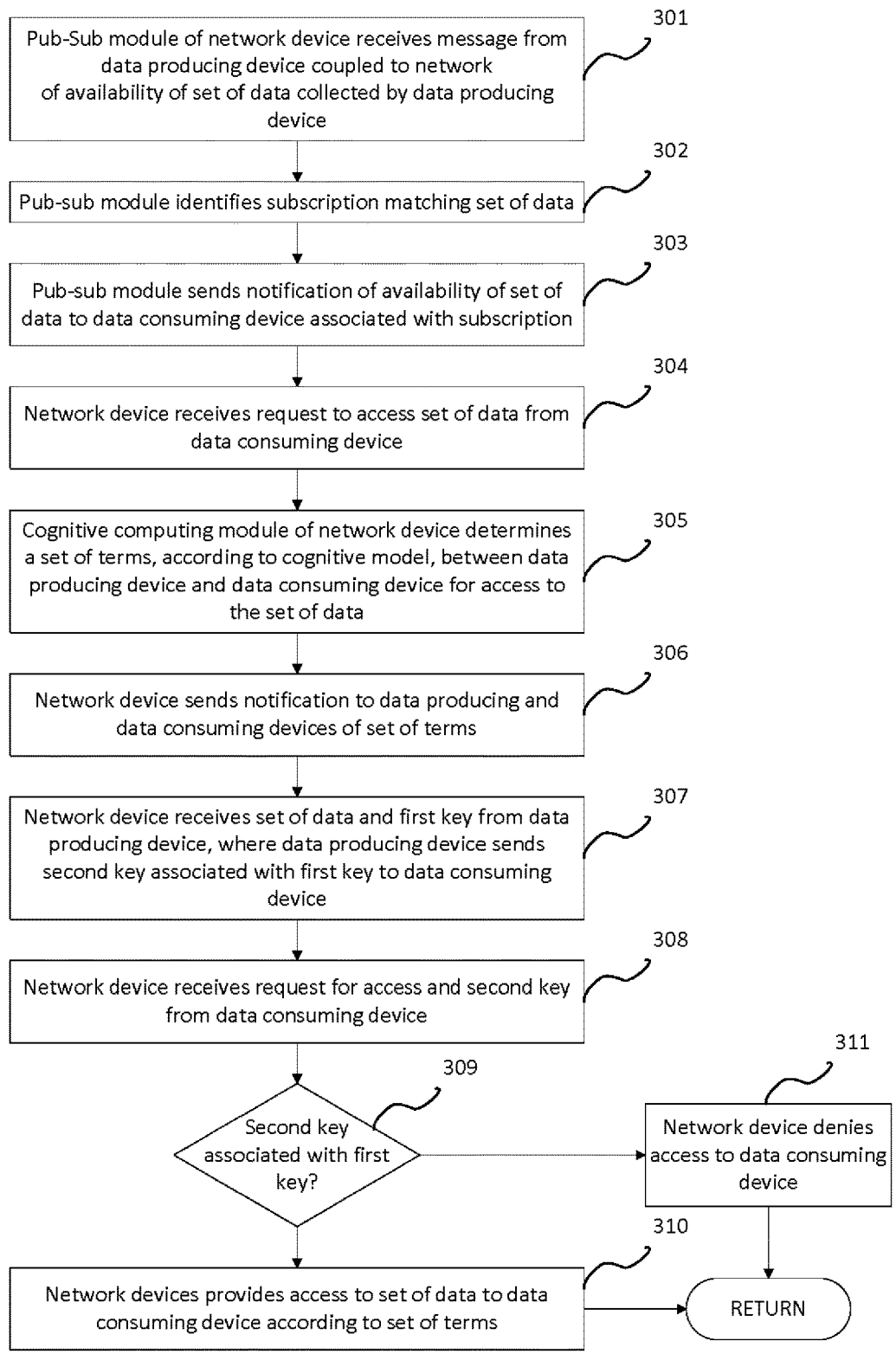
FIG. 3 illustrates in more detail the exemplary embodiment of the method for sharing data between connected devices over a network according to the present invention.

FIG. 3 illustrates in more detail the exemplary embodiment of the method for sharing data between connected devices over a network according to the present invention. The pub-sub module 107 of the network device 106 receives a message from the data producing device 102 coupled to the network 101 of the availability of a set of data collected by the data producing device 102 (301). The message may include the set of data. The set of data may include the type of device of the data producing device 102, the category of the data, demographics or other profile information for a user of the data producing device, data on the usage activity, an environment of the data producing device, a location of the data producing device during an activity, and other data that may be collected by the data producing device 102. A user of the data producing device 102 may configure the device 102 such that limitations are placed on the sharing of the set of data. For example, the device 102 may be configured to share certain collected data while maintaining privacy on other collected data. The data may be configured to be shared anonymously, without any identifying information or with limited identifying information. Upon receipt of the message, the pub-sub module 107 identifies a subscription matching the set of data (302). The subscription may match based on the type of data, demographic information, device type, etc. Upon identifying a matching subscription, the pub-sub module 107 sends a notification of the availability of the set of data to the data consuming device 104 associated with the subscription (303). When the data consuming device 104 receives the notification, the data consuming device 104 may decide whether or not to request access to the set of data. If the data consuming device 104 decides to request the access, then the data consuming device sends a request for access to the network device 106. When the network device 106 receives the request to access the set of data from the data consuming device 104 (304), the cognitive computing module 108 of the network device 106 determines a set of terms for access to the set of data, according to a cognitive model, between the data producing device 102 and the data consuming device 104 (305). The cognitive computing module 108 determines the terms based on inputted data and observations specifically pertaining the data producing device 102 and the data consuming device 104 and/or based on devices of the same or similar type as the devices 102 and 104. The set of terms may include any combination of: a level of access (e.g. a higher price for earlier access); a time when the set of data is accessible; a length of time during which the set of data is accessible; an amount of the set of data that is accessible; a location at which the set of data is accessible; limitations on the usage of the set of data; and a payment, barter, or other compensation for access to the set of data. Other terms or combination of terms may be possible.

Once the set of terms are determined, the network device 106 sends a notification to the data producing device 102 and the data consuming device 104 of the set of terms (306). Optionally, one or both of the data producing device 102 and the data consuming device 104 may confirm agreement to the set of terms before proceeding. In response to this notification, the data producing device 102 sends the set of data and a first key to the network device 106 and sends a second key associated with the first key to the data consuming device 104. In an exemplary embodiment, the first key includes an encrypted key that lists what of the set of data the data consuming device 140 can access. The network devices receives the set of data and the first key from the data producing device 102 and stores them in the storage 109. The set of data, the first key, and the set of terms would be associated with each other at the network device 106. To obtain access, the data consuming device 104 sends to the network device 106 a request to access the set of data and the second key. Upon receiving the request for access and the second key from the data consuming device (308), the network device 106 determines whether the second key is associated with the first key (309). If the second key is not associated with the first key, then the network device 106 denies access to the data consuming device 104 (311). If the second key is associated with the first key, then the network device 106 provides access to the set of data to the data consuming device 104 according to the set of terms (310).

For example, assume that a customer enters a bicycle shop with multiple data producing devices 102-103, such as a bicycle computer, a fitness watch, a cell phone, a health application on the cell phone, and demographic data on the customer. The data producing devices 102-103 have various collected data according to their configured functions. The customer has configured the data producing devices 102-103 so that the data collected by the data producing devices 102-103 may be available to other data sharing devices in the network 101 via the pub-sub module 107 under certain conditions, optionally for sale or barter. Assume also that the bicycle shop has a data consuming device 104 with a subscription with the pub-sub module 107, where the subscription is configured with conditions defining the data of interest. Referring to FIG. 3, upon detecting the close proximity of the data producing devices 102-103 of the customer and the data consuming device 104 of the bicycle shop, the data producing devices 102-103 sends a message to the pub-sub module 107 of the availability of data collected by the devices 102-103 (301). The pub-sub module 107 identifies the subscription of the bicycle shop's data consuming device 104 and the set of data available from the customer's data producing devices 102-103 as having matching conditions (302). The pub-sub module 107 sends a notification of the availability of the set of data to the data consuming device 104 of the bicycle shop (303). Assume that the data consuming device 104 sends a request for access to the network device 106 in response to the notification. When the network device 106 receives the request (304), the cognitive computing module 108 determines a set of terms between the data producing devices 102-103 of the customer and the data consuming device 104 of the bicycle shop (305). The network device 106 then sends a notification of the set of terms to the data producing devices 102-103 of the customer and the data consuming device 104 of the bicycle shop (306). The data producing devices 102-103 each sends their respective data and a first key associated with the data to the network device 106 and sends a second key associated with the first key to the data consuming device 104 of the bicycle shop. Assume that the data consuming device 104 of the bicycle shop then sends a request for access to the set of data from the data producing device 102 with the second key. Upon receiving the request and the second key from the data consuming device 104 of the bicycle shop (308), the network device 106 determines whether the second key is associated with the first key from the data producing device 102 (309). Assume that the second key is determined to be associated with the first key, in response to which the network 106 provides access to the data from the data producing device 102 according to the set of terms (310). Assume in this example that the set of terms includes a payment to the data producing device 102. The network device 106 may facilitate the payment and allow access to the set of data only after the payment transaction is complete. In this manner, data may be automatically exchanged between data producing devices and data consuming devices within an IoT system without user interaction or intervention.

Figure 4:
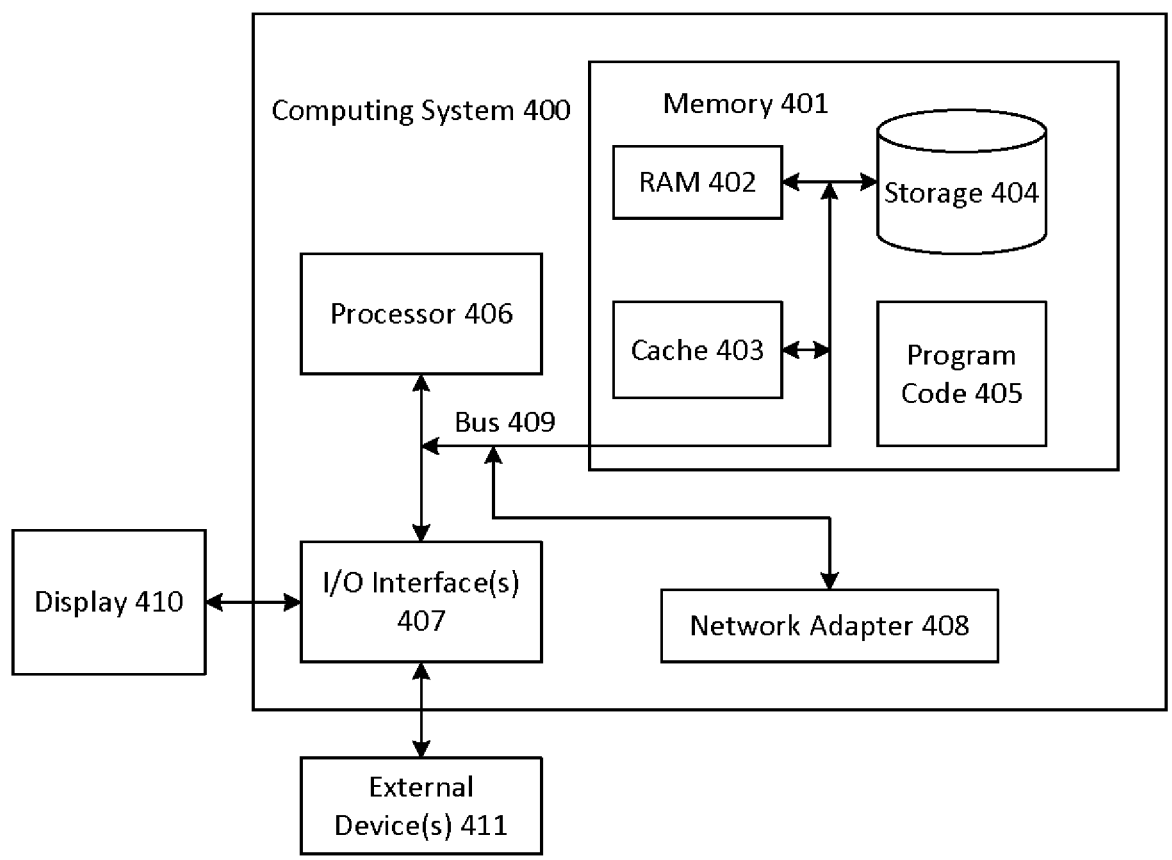
FIG. 4 illustrates an exemplary embodiment of a computing system according to the present invention.

The data producing device 102-103, the data consuming device 104-105, and the network device 106 may each be implemented as a computing system. FIG. 4 illustrates an exemplary embodiment of a computing system according to the present invention. The computing system 400 is operationally coupled to a processor or processing units 406, a memory 401, and a bus 409 that couples various system components, including the memory 401 to the processor 406. The bus 409 represents one or more of any of several types of bus structure, including a memory bus or memory controller, a peripheral bus, an accelerated graphics port, and a processor or local bus using any of a variety of bus architectures. The memory 401 may include computer readable media in the form of volatile memory, such as random access memory (RAM) 402 or cache memory 403, or non-volatile storage media 404. The memory 401 may include at least one program product having a set of at least one program code module 405 that are configured to carry out the functions of embodiments of the present invention, described above, when executed by the processor 406. The computing system 400 may also communicate with one or more external devices 411, such as a display 410, via I/O interfaces 407. The computing system 400 may communicate with one or more networks via network adapter 408.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for sharing data between connected devices over a network, comprising:
   receiving, by a network device from a data producing device, a message of an availability of a set of data collected by the data producing device, wherein the data producing device sends the message of the availability of the set of data in response to detecting a proximity of a data consuming device;
   in response to receiving the message from the data producing device, identifying, by the network device, a subscription associated with the data consuming device that matches the set of data;
   in response to identifying the subscription, sending, by the network device, a first notification of the availability of the set of data to a data consuming device associated with the subscription, wherein the first notification does not comprise the set of data;
   receiving, by the network device, a first request to access the set of data from the data consuming device coupled to the network in response to the first notification;
   in response to the first request, determining, by a cognitive computing module of the network device, a set of terms between the data producing device and the data consuming device for access to the set of data, the set of terms comprising one or more limitations on access or use of the set of data;
   in response to the determination of the set of terms, sending, by the network device, a second notification comprising the set of terms to the data producing device and the data consuming device, wherein the second notification does not comprise the set of data;
   receiving, by the network device, a first confirmation of agreement to the set of terms, the set of data, and a first key from the data producing device in response to the second notification;
   receiving, by the network device, a second confirmation of agreement to the set of terms, a second request to access the set of data, and a second key from the data consuming device in response to the second notification, wherein the data consuming device received the second key from the data producing device in response to the second notification;
   determining, by the network device, that the second key is associated with the first key; and
   in response to determining that the second key is associated with the first key, providing, by the network device, access to the set of data to the data consuming device according to the one or more limitations comprised in the set of terms.

2. The method of claim 1, wherein the determining that the second key is associated with the first key, and the providing of the access to the set of data to the data consuming device according to the set of terms, comprises:
   determining, by the network device, whether the second key is associated with the first key;
   in response to determining that the second key is not associated with the first key, denying access to the set of data by the data consuming device; and
   in response to determining that the second key is associated with the first key, providing access to the set of data to the data consuming device according to the set of terms.

3. The method of claim 1, wherein the cognitive computing module determines the set of terms using a cognitive model based on inputted data and observations specifically pertaining to the data producing device and the data consuming device.

4. A computer program product for sharing data between connected devices over a network, the computer program product comprising a computer readable storage medium having program instructions embodied therewith, the program instructions executable by a processor to cause the processor to:
   receive, from a data producing device, a message of an availability of a set of data collected by the data producing device, wherein the data producing device sends the message of the availability of the set of data in response to detecting a proximity of a data consuming device;
   in response to receiving the message from the data producing device, identify a subscription associated with the data consuming device that matches the set of data;
   in response to identifying the subscription, send a first notification of the availability of the set of data to a data consuming device associated with the subscription, wherein the first notification does not comprise the set of data;
   receive a first request to access the set of data from a data consuming device coupled to the network in response to the first notification;
   in response to the first request, determine, using a cognitive computing module, a set of terms between the data producing device and the data consuming device for access to the set of data, the set of terms comprising one or more limitations on access or use of the set of data;
   in response to the determination of the set of terms, send a second notification comprising the set of terms to the data producing device and the data consuming device, wherein the second notification does not comprise the set of data;
   receive a first confirmation of agreement to the set of terms, the set of data and a first key from the data producing device;
   receive a second confirmation of agreement to the set of terms, a second request to access the set of data, and a second key from the data consuming device in response to the second notification, wherein the data consuming device received the second key from the data producing device in response to the second notification;

determine that the second key is associated with the first key; and in response to determining that the second key is associated with the first key, provide access to the set of data to the data consuming device according to the one or more limitations comprised in the set of terms.

5. The computer program product of claim 4, wherein the determining that the second key is associated with the first key, and the providing of the access to the set of data to the data consuming device according to the set of terms, comprises:

determine whether the second key is associated with the first key;

in response to determining that the second key is not associated with the first key, deny access to the set of data by the data consuming device; and in response to determining that the second key is associated with the first key, provide access to the set of data to the data consuming device according to the set of terms.

6. The computer program product of claim 4, wherein the cognitive computing module determines the set of terms using a cognitive model based on inputted data and observations specifically pertaining to the data producing device and the data consuming device.

7. A system, comprising:

a processor; and a computer readable storage medium having program instructions embodied therewith, the program instructions executable by a processor to cause the processor to:

receive, from a data producing device, a message of an availability of a set of data collected by the data producing device, wherein the data producing device sends the message of the availability of the set of data in response to detecting a proximity of a data consuming device;

in response to receiving the message from the data producing device, identify a subscription associated with the data consuming device that matches the set of data;

in response to identifying the subscription, send a first notification of the availability of the set of data to a data consuming device associated with the subscription, wherein the first notification does not comprise the set of data;

receive a first request to access the set of data from a data consuming device coupled to the network in response to the first notification;

in response to the first request, determine, using a cognitive computing module, a set of terms between the data producing device and the data consuming device for access to the set of data, the set of terms comprising one or more limitations on access or use of the set of data;

in response to the determination of the set of terms, send a second notification comprising the set of terms to the data producing device and the data consuming device, wherein the second notification does not comprise the set of data;

receive a first confirmation of agreement to the set of terms, the set of data and a first key from the data producing device;

receive a second confirmation of agreement to the set of terms, a second request to access the set of data and a second key from the data consuming device in response to the second notification, wherein the data consuming device received the second key from the data producing device in response to the second notification;

determine that the second key is associated with the first key; and in response to determining that the second key is associated with the first key, provide access to the set of data to the data consuming device according to the one or more limitations comprised in the set of terms.

8. The system of claim 7, wherein the determining that the second key is associated with the first key, and the providing of the access to the set of data to the data consuming device according to the set of terms, comprises:

determine whether the second key is associated with the first key;

in response to determining that the second key is not associated with the first key, deny access to the set of data by the data consuming device; and in response to determining that the second key is associated with the first key, provide access to the set of data to the data consuming device according to the set of terms.

9. The system of claim 7, wherein the cognitive computing module determines the set of terms using a cognitive model based on inputted data and observations specifically pertaining to the data producing device and the data consuming device.

* * * * *